United States Patent [19]

Mark

[11] 4,093,590
[45] June 6, 1978

[54] FLAME RETARDANT POLYCARBONATE COMPOSITION

[75] Inventor: Victor Mark, Evansville, Ind.

[73] Assignee: General Electric Company, Pittsfield, Mass.

[21] Appl. No.: 705,025

[22] Filed: Jul. 14, 1976

Related U.S. Application Data

[62] Division of Ser. No. 429,126, Dec. 28, 1973, Pat. No. 3,978,024.

[51] Int. Cl.$^2$ ............................................. C08K 5/42
[52] U.S. Cl. ........................ 260/45.85 S; 260/45.7 S; 260/45.85 H; 260/860; 260/823
[58] Field of Search ............ 260/860, 45.7 S, 47 XA, 260/45.85 H, 45.85 S

[56] References Cited

U.S. PATENT DOCUMENTS

| | | | |
|---|---|---|---|
| 2,283,236 | 5/1942 | Soday | 260/505 |
| 3,043,800 | 7/1962 | Schnell et al. | 260/47 |
| 3,062,781 | 11/1962 | Bottenbruch et al. | 260/47 |
| 3,166,606 | 1/1965 | Reinking et al. | 260/860 |
| 3,236,808 | 2/1966 | Goldberg et al. | 260/49 |
| 3,374,210 | 3/1968 | Muller et al. | 260/79.3 |
| 3,475,372 | 10/1969 | Gable | 260/45.75 |
| 3,528,947 | 9/1979 | Lappin et al. | 260/75 |
| 3,663,509 | 5/1972 | Bonnard et al. | 260/49 |
| 3,775,367 | 11/1973 | Nouvertne | 260/45.9 |
| 3,978,024 | 8/1976 | Mark | 260/45.85 T |

*Primary Examiner*—Lewis T. Jacobs
*Attorney, Agent, or Firm*—William F. Mufatti

[57] ABSTRACT

A flame retardant polycarbonate composition comprising in admixture an aromatic carbonate polymer and a flame retardant additive which may be the metal salts of either monomeric or polymeric phenol ester sulfonic acids, or mixtures thereof.

11 Claims, No Drawings

FLAME RETARDANT POLYCARBONATE COMPOSITION

This is a division of application Ser. No. 429,126, filed Dec. 28, 1973, now U.S. Pat. No. 3,978,024, Aug. 31, 1976.

This invention is directed to a flame retardant polycarbonate composition and in particular an aromatic polycarbonate containing in admixture therewith a particular flame retardant additive which may be the metal salts of either monomeric or polymeric phenol ester sulfonic acids, or mixtures thereof.

BACKGROUND OF THE INVENTION

With the increasing concern for safety, there is a positive move towards providing safe materials for public and household use. One particular area of need is that of providing flame resistant or flame retardant products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters Laboratories, Inc. Bulletin 94. This Bulletin sets forth certain conditions by which materials are rated for self-extinguishing characteristics.

In the art, there are many known flame retardant additives which are employed by mixing with products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

DESCRIPTION OF THE INVENTION

It has now been surprisingly discovered that an aromatic polycarbonate can be made flame retardant by incorporating with the aromatic polycarbonate minor amounts of certain additives, which additives are inert and do not degrade the aromatic polycarbonate. The particular additive employed herein is unique in that even very minor amounts render the aromatic polycarbonate flame retardant. The amount of the additive employed herein can vary, preferably, from 0.01 to about 10 weight percent based on the weight of the aromatic polycarbonate.

More specifically, the particular additive of this invention is the metal salt of either the monomeric or polymeric substituted and unsubstituted phenol ester sulfonic acid and includes mixtures thereof. The metal salt employed in the practice of this invention is either the alkali metal or alkali earth metal salt or mixtures of these. The metals of these groups are sodium, lithium, potassium, rubidium, cesium, beryllium, magnesium, calcium, strontium and barium.

When the phenol ester sulfonic acid employed in the practice of this invention is a substituted phenol ester sulfonic acid, the substituent consists of an electron withdrawing radical. As employed herein and within the scope of this invention, any of the electron withdrawing radicals can be employed in the practice of this invention. However, preferably, the electron withdrawing radical or substituent employed in the practice of this invention is the halo-, nitro-, trihalomethyl and cyano electron withdrawing radicals or mixtures of these electron withdrawing radicals.

The electron withdrawing phenomenon, or as it is also referred to as electronegativity, is defined in *Basic Principles of Organic Chemistry* by Roberts and Caserio, 1964 (pages 185–186), and *Physical Organic Chemistry* by Jack Hine, McGraw-Hill Book Company, Inc., 1962 (pages 5, 32 and 85–93). Briefly, the electron withdrawing phenomenon is where the radical has a strong affinity for a negative charge, namely electrons, but still remains covalent and does not form an ion. This is an extremely brief description of this phenomenon and is merely set forth here to describe the electron withdrawing effect. Reference should be made to the texts set forth above.

In the practice of this invention, the types of sulfonic acids employed herein may be either the monomeric form or the polymeric form or mixtures of these. When first considering the monomeric form, the metal salt of the unsubstituted and substituted monomeric phenol ester sulfonic acid can best be represented by the following formula:

$$[R]_z\{[O_qA]_u[X]_y[O_vB]_r\}m \qquad \text{I.}$$

wherein $A$ and $B$ are independently selected from the following formula:

$$R'(SO_3M)_nR''_p \qquad \text{II.}$$

wherein $R'$ is an aromatic radical of one to four aromatic nuclei, M is a metal which may be selected from the periodic table of either an alkali metal or an alkali earth metal, $R''$ is an electron withdrawing radical, $n$ is an integer of 0 to 4 and $p$ is an integer of 0 to 10, provided, however, that the sum of $n$ must be at least 1.

In Formula I above, [R] is an organic radical of 1–20 carbon atoms and is either alkyl, aralkyl, alkenyl, aralkenyl, aryl, arylene, alkylene, aralkylene, alkenylene, aralkenylene, alkylidene, aralkylidene, alkenylidene or aralkenylidene and the group comprising [A] and [B] as well as a trivalent and tetravalent aromatic nucleus. It should also be understood that the radical [R] can also contain halogen substituents which would be an electron withdrawing radical and sulfonic acid salt substituents. In Formula I, [X] is a di-, tri- or tetravalent radical selected from the following:

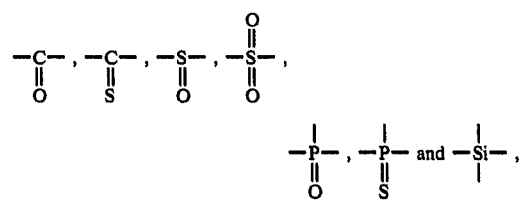

$y$ is an integer of 1–2, $m$, $u$, $v$, $q$ and $r$ are integers of 1–4 and $z$ is an integer of 0–3, and 0 is oxygen.

In the above Formula I, the presence of the ($SO_3M$) radical on the phenol ester is the novel feature of the instant invention that offers the excellent flame retardant properties when admixed with an aromatic polycarbonate.

Actually, while there are many compounds that meet the requirements of Formula I and which offer excellent flame retardant characteristics to an aromatic polycarbonate, the preferred additive employed in the monomeric form is the sodium salt of the sulfonic acid of dichlorophenyl 2,4,5-trichlorobenzenesulfonate. This has the following formula:

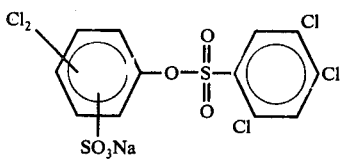

When the polymeric form of the unsubstituted and substituted aromatic sulfonic acid is employed in the practice of this invention, it can best be represented by the following formula:

wherein [A] and [B] are independently selected from the following formula:

$$(O)_q R'(SO_3M)_n R''_p \qquad \text{IV.}$$

wherein (O), R', M, R'', n, p and q have the same meaning as cited previously. In addition, [R], [X] and z have the same meaning as cited previously. Also, the same requirements for n are also applicable. In Formula III, a is an integer of from 0–2000 and b is an integer of from 0–2000, provided, however, that the sum of a and b must be at least 4 and can be as high as 2000. As shown, the selections of a and b can be random or equal or one can be zero (0).

In the practice of this invention, it is to be understood that the polymeric structure can be either a homopolymer, a copolymer, a random copolymer, a block copolymer or a random-block copolymer, or mixtures of these polymeric forms. In addition, the ratio of sulfonated phenolic rings to unsubstituted phenolic rings can vary from 1 to 1 to as high as that which is barely necessary to render the polycarbonate flame retardant and this may be 1 to 1000.

While there are many compounds that meet the requirements of Formula III and which offer excellent flame retardant characteristics to an aromatic polycarbonate, the preferred employment of the instant invention is provided by the application of Formula III in its simplest form, which is the metal salt of a sulfonated polycarbonate itself. In this version then, the metal sulfonate ($SO_3M$) function is attached directly to the polycarbonate backbone itself, a feature which precludes eventual migration or plating out phenomena. The sulfonation of the polycarbonate, which may be a homopolymer or a copolymer (random, block or random-block copolymer) is then carried out to provide the metal sulfonate ($SO_3M$) radical in 0.01 to 10% concentration in the polymer. It is understood that part or all of the effective species may also be introduced separately by compounding a non-sulfonated polycarbonate with a sulfonated one. In addition, a partially sulfonated polycarbonate may also contain fire retardant additives represented by Formulae I and III. It is further understood that mixtures of this version of the instant invention can also be used.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

Ninety-nine parts of an aromatic polycarbonate, prepared by reacting 2,2-bis(4-hydroxyphenyl)propane and phosgene in the presence of an acid acceptor and a molecular weight regulator and having an intrinsic viscosity of 0.57 is mixed with 1 part of a finely ground dehydrated additive listed in Table I by tumbling the ingredients together in a laboratory tumbler. The resulting mixture is then fed to an extruder, which extruder is operated at about 265° C., and the extrudate is comminuted into pellets.

The pellets are then injection molded at about 315° C. into test bars of about 5 in. by ½ in. by about 1/16–⅛ in. thick. The test bars (five for each additive listed in the Table) are subject to the test procedure set forth in Underwriters Laboratories, Inc. Bulletin UL-94, Burning Test for Classifying Materials. In accordance with this test procedure, materials so investigated are rated either SE-0, SE-I or SE-II based on the results of five specimens. The criteria for each SE rating per UL-94 is briefly as follows:

"SE-0": Average flaming and/or glowing after removal of the igniting flame shall not exceed 5 seconds and none of the specimens shall drip flaming particles which ignite absorbent cotton.

"SE-I": Average flaming and/or glowing after removal of the igniting flame shall not exceed 25 seconds and the glowing does not travel vertically for more than ⅛ inch of the specimen after flaming ceases and glowing is incapable of igniting absorbent cotton.

"SE-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars must meet the SE type rating to achieve the particular rating. Otherwise, the five bars receive the rating of the worst single bar. For example, if one bar is classified as SE-II and the other four are classified as SE-0, then the rating for all bars is SE-II.

The results of the different additives within the scope of the instant invention are as follows with a control being the aromatic polycarbonate as prepared above without the additive of the type set forth herein.

TABLE 1.

| Additive (1 weight percent) | Flame Out Time Seconds (Avg.) | No. of Drips Per Test Bar | Rating |
|---|---|---|---|
| CONTROL | 31.6 | 4+ | Burns |
| Sodium [phenyl 2,4,5-trichlorobenzenesulfonate]-4'-sulfonate | 6.0 | 0 | SE-I |
| Calcium [4-bromophenyl 2,4,5-trichlorobenzenesulfonate]-3'-sulfonate | 4.0 | 1.6 | SE-II |
| Sodium [4,4'-dichlorodiphenyl carbonate]-2-sulfonate | 3.9 | 0.8 | SE-O |
| Potassium [tris(2-chlorophenyl phosphate]-4-sulfonate | 5.6 | 4.0 | SE-II |
| Barium [bis(4-bromophenyl sulfate]-3-sulfonate | 7.0 | 3.0 | SE-II |
| Sodium [bis-2,4,5-trichlorophenyl terephthalate]-x-sulfonate | 3.2 | 0 | SE-O |
| Disodium [diphenyl oxalate]-4,4'-disulfonate | 6.6 | 1.2 | SE-II |
| Sodium [phenyl pentachlorobenzenephosphonate]-4'-sulfonate | 4.4 | 0.8 | SE-II |
| Disodium [diphenyl dibromomaleate]-4,4'-disulfonate | 3.3 | 1.4 | SE-II |
| Disodium [BPA-bis(2,4,5-trichlorobenzenesulfonate]-2,2'-disulfonate | 4.1 | 0 | SE-O |
| Polysodium (bisphenol-A-polycarbonate) polysulfonate | 5.0 | 0.8 | SE-I |
| Polysodium [(bisphenol-A)-(tetrabromobisphenol-A)copolycarbonate]-polysulfonate | 3.9 | 0 | SE-O |
| Polysodium [(bisphenol-A)-(tetrachlorobisphenol-A)copolycarbonate]-polysulfonate | 4.4 | 0 | SE-O |
| Sodium [pentachlorophenyl benzoate]-3-sulfonate | 2.8 | 0 | SE-O |
| Sodium [bis(p-chlorophenyl isophthalate]-5-sulfonate | 4.2 | 1.0 | SE-II |
| Sodium salt of hydroquinone [thionobenzoate] [2',4',5'-trichlorobenzenesulfonate]-2-sulfonic acid | 3.9 | 2.0 | SE-II |
| Potassium (pentachlorophenyl)phenyl methylphosphonate-4-sulfonate | 3.6 | 0 | SE-O |
| Sodium 2-chlorophenyl benzenesulfinate-4-sulfonate | 4.6 | 1.0 | SE-II |
| Disodium bis(4-chlorophenyl)succinate 2,2'-disulfonate | 4.6 | 2.0 | SE-II |
| Lithium O-(4'-chlorophenyl) diphenyl phosphinothioate-3-sulfonate | 2.8 | 1.0 | SE-II |
| Disodium salt of bis(2-chlorophenoxy) methylphenylsilane 4,4'-disulfonic acid | 3.8 | 2.0 | SE-II |

EXAMPLE II

This Example is set forth to demonstrate the effectiveness of introducing the metal sulfonate ($SO_3M$) radical directly into the polycarbonate backbone. The extent of sulfonation is such that the ($SO_3M$) moiety comprises from 0.01 to up to 10 weight percent of the polymer.

EXAMPLE III

This Example is set forth to demonstrate the effect of the flame retardant additives of this invention at the lower limits of 0.01 weight percent based on the weight of the polymer composition.

In preparing the test bars for this Example 99.99 parts of the polycarbonate of Example I is mixed with 0.01 weight percent of the additives listed in Table 2 employing the same procedure. Test bars are then molded

TABLE 2.

| Additive | Flame Out Time Seconds (Avg.) | No. of Drips Per Test Bar | Rating |
|---|---|---|---|
| CONTROL | 31.6 | 4+ | Burns |
| Polysodium (bisphenol-A-polycarbonate) polysulfonate (containing 1.1 weight percent ($SO_3Na$) radical) | 5.8 | 0.8 | SE-I |
| Polysodium [(bisphenol-A)-(tetrabromobisphenol-A) copolycarbonate]-polysulfonate (containing 1.1 weight percent ($SO_3Na$) radical and 0.8 weight percent bromine) | 3.0 | 0.8 | SE-O |
| Polysodium [(bisphenol-A)-(tetrachlorobisphenol-A) copolycarbonate]-polysulfonate (containing 1.1 weight percent ($SO_3Na$) radical and 1.3 weight percent chlorine) | 4.2 | 0 | SE-O |
| Polysodium (bisphenol-A-polycarbonate) polysulfonate (containing 0.1 weight percent ($SO_3Na$) radical and 1.0 weight percent (bisphenol-A)-polycarbonate-poly(phenylphosphonate) copolymer) | 8.6 | 3.2 | SE-II |
| Polysodium (bisphenol-A)(isophthalic acid-terephthalic acid)(copolyester polycarbonate) polysulfonate (containing 2.7 weight percent ($SO_3Na$) radical) | 4.2 | 0 | SE-O | using the same procedure employed in Example I. The test bars are subjected to the same test procedure of Example I with the following results:

TABLE 3.

| Additive (0.01 weight percent) | Flame Out Time Seconds (Avg.) | No. of Drips Per Test Bar | Rating | Remarks |
|---|---|---|---|---|
| CONTROL | 31.6 | 4+ | Burns | |
| Sodium [phenyl 2,4,5-trichlorobenzene-sulfonate]-4'-sulfonate | 8.6 | 2.2 | SE-II | |
| Disodium [BPA bis(2,4,5-trichlorobenzene-sulfonate]-2,2'-disulfonate | 11.2 | 1.6 | SE-II | |

EXAMPLE IV

This Example is set forth to show the effect of a known commercially available flame retardant additive.

A.

Example I is repeated except that in place of the additives employed therein, only 1 part 1,2,5,6,9,10-hexabromocyclododecane is used herein. The results obtained upon evaluating (five) test bars are the same as obtained for the Control shown in Table 1. above.

B.

Part A. above is repeated but using 5 weight percent of the above additive, namely 1,2,5,6,9,10-hexabromocyclododecane. The results obtained are the same as obtained in Part A. above.

C.

Part A. above is repeated but using 10 weight percent of the above additive, namely 1,2,5,6,9,10-hexabromocyclododecane. At this level of additive, test bars are rated SE-II However, the polycarbonate is badly degraded as evidenced by severe dark streaking of the molded test bars, which degradation does not occur with the additives of the instant invention.

EXAMPLE V

Example IV is repeated except that hexabromobiphenyl is employed herein. The results obtained are essentially the same as those of Example IV.

EXAMPLE VI

Example IV is repeated except that the additive employed herein is a combination of antimony oxide and a material which is a mixture of polychlorinated biphenyl (Aroclor by Monsanto Company). The proportion of the ingredients of the additive employed in this example is based on 3 parts of chlorine per 1 part of antimony. The results obtained at 1 weight percent and 5 weight percent amounts are the same as in Example IV.

However, at the higher amount, namely 10 weight percent, flame retardancy effect is noted with, again, severe degradation of the polycarbonate, as evidenced by the substantial reduction in the intrinsic viscosity of the molded test bars. As molded, the intrinsic viscosity of the test bars is about 0.50. The intrinsic viscosity of the molded test bars containing 10 weight percent of the flame retardant additive of this Example is 0.253. This shows the severe degradation of the polycarbonate when employing this type of well known flame retardant.

In the practice of this invention, aromatic carbonate polymers are rendered flame retardant by the addition of certain particular additives which are the metal salts of substituted and unsubstituted monomeric or polymeric phenol ester sulfonic acids, or mixtures of these. The amount of the additives employed in the practice of this invention may vary from 0.01 to up to that amount which does not cause degradation of the physical properties of the aromatic carbonate polymer. This is generally up to 10 weight percent based on the weight of the aromatic carbonate polymer but may be higher if degradation of the aromatic carbonate polymer does not occur. Also, in some cases, it has been found that above 10 weight percent level, no added advantage in flame retardancy has been observed. The amount of the additive to be employed can also be a function of the degree of flame retardancy desired.

The novelty of the instant invention is achieved by the introduction of the sulfonic radical ($SO_3M$) into the aromatic rings of the phenolic esters. It is not exactly understood how the additive of this invention functions or how such minor amounts can act as an effective flame retardant for the aromatic carbonate polymer. Analysis of the composition of this invention after being subjected to a fire temperature of about 600° C. showed an unusually high percentage of remaining char. This leads one to hypothesize that the additive may act as a cross-linking agent when the aromatic carbonate polymer is subjected to fire temperatures.

As indicated previously, the additive of the instant invention comprises the alkali or alkali earth metal salts of the substituted and unsubstituted monomeric or polymeric phenolic ester sulfonic acids or mixtures of these. While a great number of such salts are set forth in the tables of the Examples of the instant invention, these are only a representative sample of the additives of this invention. The sodium, calcium, magnesium, potassium, strontium, lithium, barium, rubidium and cesium salts of other aromatic sulfonic acids can be employed in place of those of the Examples with the same effective flame retardancy being achieved. These other aromatic sulfonic acids are:

triphenyl trimellitate disulfonic acid
4-chlorophenyl thionobenzoate sulfonic acid
4,4'-dichlorodiphenylsulfite disulfonic acid
4,5-dibromophenyl benzenesulfonate sulfonic acid
diphenyl sulfate sulfonic acid
tri(α-naphthyl)phosphate trisulfonic acid
hydroquine bis(phenyl phenylphosphonate)sulfonic acid
tetrabromobisphenol-A-bis(4-chlorophenyl sulfate)disulfonic acid
diphenyl dibromomaleate disulfonic acid
bisphenol-A-bis[bis(4-chlorophenyl)thiophosphate]disulfonic acid
poly(diphenylsiloxane)polysulfonic acid
poly(bisphenol-A-tetrachlorobisphenol-A)polysulfonic acid
bisphenol-A-bis(2,4,5-trichlorobenzenesulfonate)sulfonic acid In the practice of this invention, the additive or the sulfonated polymer are prepared by sulfonation methods well known in the art. For example, one sulfonates the phenol ester or the (phenol ester) polymer (such as the polycarbonate) by subjecting it, in solution, to the action of liquid SO₃ and by neutralizing the resultant sulfonic acid. The salt is then recovered by precipitation or by distillation of the solvent.

In the practice of this invention, any of the aromatic polycarbonates can be employed herein. However, particularly useful are the aromatic polycarbonates prepared by reacting a dihydric phenol, such as bisphenol-A (2,2′bis(4 hydroxyphenyl) propane) with a carbonate precursor. Typical of some of the dihydric phenols that may be employed in the practice of this invention are bis(4-hydroxyphenyl)methane, 2,2-bis(4-hydroxyphenyl) propane, 2,2-bis(4-hydroxy-3-methylphenyl)propane, 4,4-bis(4-hydroxyphenyl)heptane, 2,2-(3,5,3′,5′-tetrachloro-4,4′-dihydroxydiphenyl)propane, 2,2-(3,5,3′,5′-tetrabromo-4,4′-dihydroxydiphenyl)propane, (3,3′-dichloro-4,4′-dihydroxydiphenyl)methane. Other dihydric phenols of the bisphenol type are also available and are disclosed in U.S. Pat. Nos. 2,999,835, 3,028,365 and 3,334,154.

In addition, the reaction is carried out with the carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

As stated previously, mixtures can be employed herein. These mixtures can consist of, for example, (a) mixtures of metal salts of unsubstituted and substituted monomeric phenol ester sulfonic acids, (b) mixtures of metal salts of unsubstituted and substituted polymeric phenol ester sulfonic acids, (c) mixtures of (a) and (b), and (d) mixtures of any of the above with metal salts of sulfonic acid substituted carbonate polymers. The mixtures herein offer certain advantages in providing flame retardancy of SE-0 rating of five test bars and essentially no drips per bar.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A flame retardant carbonate polymer composition selected from the group consisting of:
   (a) a carbonate polymer having in admixture a minor amount of an additive selected from the group consisting of the metal salts of unsubstituted and substituted polymeric phenol ester sulfonic acid, and mixtures of the metal salts of unsubstituted and substituted monomeric phenol ester sulfonic acid and the metal salts of unsubstituted and substituted polymeric phenol ester sulfonic acid wherein the metal salts are selected from the group consisting of the alkali metal salts and alkali earth metal salts and mixtures of these metal salts, and the substituent on the metal salts of the substituted monomeric and polymeric phenol ester sulfonic acid is selected from the group consisting of an electron withdrawing radical, and mixtures of electron withdrawing radicals,
   (b) a metal salt of a sulfonic acid substituted carbonate polymer wherein said metal salt comprises from 0.01 to up to 10.0 weight percent of said polymer, and
   (c) mixtures of (a) and (b).

2. The composition of claim 1 wherein the admixture comprises 0.01 to about 10 weight percent of the additive based on the weight of the aromatic carbonate polymer composition.

3. The composition of claim 1 wherein the electron withdrawing radical is selected from the group consisting of halo-, nitro-, trihalomethyl- and cyano- radicals, and mixtures thereof.

4. The composition of claim 1 wherein the metal salt of the unsubstituted and substituted polymeric phenol ester sulfonic acid has the following formula:

   I.

wherein [A] and [B] are independently selected from the following formula:

   II.

wherein R′ is an aromatic radical of 1–4 aromatic nuclei, O is oxygen, M is a metal selected from the group consisting of alkali metal and alkali earth metal, R″ is an electron withdrawing radical, q is an integer of from 1–4, n is an integer of from 0–4 and p is an integer of from 0–10; 20 and wherein in Formula I, [R] is an organic radical of 1–20 carbon atoms and is selected from the group consisting of alkyl, aralkyl, alkenyl, aralkenyl, aryl, arylene, alkylene, aralkylene, alkenylene, aralkenylene, alkylidene, aralkylidene, alkenylidene, aralkenylidene, [A] and [B], z is an integer of from 0–1, X] is selected from the group consisting of:

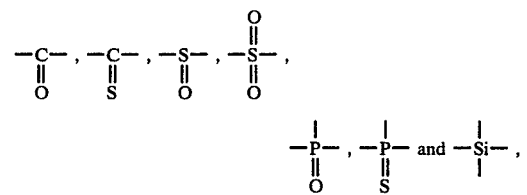

y is an integer of from 1–2, m is an integer of from 1–4 and a is an integer of from 0–2000 and b is an integer of from 0–2000; provided, however, that the sum of a and b must equal at least 4 and further provided that the sum of n when employed in Formula I must be at least 1.

5. The composition of claim 4 wherein the electron withdrawing radical is selected from the group consisting of halo-, nitro-, trihalomethyl- and cyano- and mixtures thereof.

6. The composition of claim 4 wherein the electron withdrawing radical is chlorine.

7. The composition of claim 4 wherein M is sodium.

8. The composition of claim 4 wherein the metal salt of the substituted polymeric phenol ester sulfonic acid is sodium [phenyl 2,4,5-trichlorobenzenesulfonate]-4′-sulfonate.

9. This composition of claim 1 wherein the metal salt of a sulfonic acid substituted sulfonated carbonate polymer is polysodium [(bisphenol-A)-(tetrabromobisphenol-A) copolycarbonate] polysulfonate having therein 1.1 weight percent of (SO₃Na) radical and 0.8 weight percent bromine based on the weight of the polymer.

10. The composition of claim 1 (b) wherein the metal salt of a sulfonic acid substituted carbonate polymer is polysodium (bisphenol-A-polycarbonate) polysulfonate having therein 1.1 weight percent of (SO₃Na) radical based on the weight of the polymer.

11. The composition of claim 1 (b) wherein the metal salt of a sulfonic acid substituted sulfonated carbonate polymer is polysodium (bisphenol-A) (isophthalic acid-terephthalic acid) (copolyestercarbonate) polysulfonate having therein 2.7 weight percent of (SO₃Na) radical based on the weight of the polymer.

* * * * *